(12) United States Patent
Rajagopal et al.

(10) Patent No.: US 7,590,969 B2
(45) Date of Patent: Sep. 15, 2009

(54) TYPE SYSTEM

(75) Inventors: Ramesh Rajagopal, Seattle, WA (US); Patrick Shyhuei Tseng, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/824,253

(22) Filed: Apr. 14, 2004

(65) Prior Publication Data

US 2005/0235250 A1    Oct. 20, 2005

(51) Int. Cl.
*G06F 9/44* (2006.01)

(52) U.S. Cl. .................. 717/105; 717/109; 717/108; 717/116

(58) Field of Classification Search .......... 717/104, 717/105
See application file for complete search history.

(56) References Cited

U.S. PATENT DOCUMENTS

| | | | | |
|---|---|---|---|---|
| 5,872,973 A * | 2/1999 | Mitchell et al. | ............. | 719/332 |
| 5,930,798 A * | 7/1999 | Lawler et al. | ............... | 707/102 |
| 6,421,821 B1 * | 7/2002 | Lavallee | ............... | 717/109 |
| 6,442,748 B1 * | 8/2002 | Bowman-Amuah | ......... | 717/108 |
| 6,550,057 B1 * | 4/2003 | Bowman-Amuah | ......... | 717/126 |
| 6,601,234 B1 * | 7/2003 | Bowman-Amuah | ......... | 717/108 |
| 6,851,106 B1 * | 2/2005 | Narisawa et al. | ............ | 717/108 |
| 6,874,146 B1 * | 3/2005 | Iyengar | ..................... | 719/313 |
| 6,898,782 B1 * | 5/2005 | Brodsky et al. | ............. | 717/104 |
| 6,898,783 B1 * | 5/2005 | Gupta et al. | ................ | 717/105 |
| 7,000,219 B2 * | 2/2006 | Barrett et al. | ............... | 717/107 |
| 7,137,100 B2 * | 11/2006 | Iborra et al. | ................ | 717/106 |
| 2002/0100014 A1 * | 7/2002 | Iborra et al. | ................ | 717/104 |
| 2002/0104068 A1 * | 8/2002 | Barrett et al. | ............... | 717/104 |
| 2004/0015858 A1 * | 1/2004 | Seto et al. | .................... | 717/120 |
| 2005/0071806 A1 * | 3/2005 | Sreedhar | ..................... | 717/104 |
| 2005/0076328 A1 * | 4/2005 | Berenbach et al. | .......... | 717/104 |
| 2005/0125438 A1 * | 6/2005 | Krishnaswamy et al. | .... | 707/102 |
| 2005/0125806 A1 * | 6/2005 | Bussler et al. | .............. | 719/316 |

OTHER PUBLICATIONS

Barry Cornelius, Comparing .NET with Java, 2002, retrieved from <http://www.barrycornelius.com/papers/comparing.dotnet.with.java/master.pdf>, p. 1-10.*

Bill Schneider, "Microsoft CMS 2002 and VisualStudio.NET", Nov. 19, 2002, retrived from <http://www.cmswatch.com/Feature/80-CMS-and-IDEs>, pp. 1-16.*

Richard Grimes, "C++ Attributes: Make COM Programming a Breeze with New Feature in Visual Studio .NET", MSDN Magazine Apr. 2001, retrieved from <http://msdn.microsoft.com/en-us/magazine/cc301337.aspx>, pp. 1-16.*

(Continued)

*Primary Examiner*—Tuan Q Dam
*Assistant Examiner*—Marina Lee
(74) *Attorney, Agent, or Firm*—Workman Nydegger (57) ABSTRACT

A data structure and application programming interface for creating and manipulating object model artifacts within a meta-model is provided. The data structure may include higher level abstractions of the type system to provide a set of services to implement software design tools and editors.

18 Claims, 10 Drawing Sheets

OTHER PUBLICATIONS

Abrams et al., "Programming in .NET: The Type System", Jan. 17, 2003, retrieved from <http://www.informit.com/articles/article.aspx?p=30608>, pp. 1-28.*

ECMA International, Standardizing Information and Communications Systems "*Common Language Infrastructure (CILI) Partitions I to V*," Standard ECMA-335, $2^{nd}$ Ed. (Dec. 2002).

* cited by examiner

TYPE SYSTEM

FIELD OF THE INVENTION

Aspects of the present invention relate generally to data structures and object-oriented computer programming. More specifically, aspects of the present invention provide a data structure and application programming interfaces to define and manipulate object model artifacts.

BACKGROUND

Defining methods and classes for software objects or modules is an important part of the software design cycle. Typically, the creation of methods or classes must be specified in a specific programming language. The use of programming languages, however, requires adhering to detailed syntax which is undesirable, as a user may not be an expert in the particular programming language being utilized to create the method or class.

The Common Language Infrastructure Standard ECMA 325 provides a specification in which applications that are written in high-level languages such as C# or C++ may be executed in different system environments without the need to rewrite the applications. The Common Language Infrastructure Standard provides a Common Type System (CTS) which supports types and operations found in high-level languages. Though the Common Type System makes it easier to execute components and applications written in different programming languages, a user or developer must still be knowledgeable and adhere to detailed syntax of the particular programming language the user or developer utilized to create the components and applications.

The Common Type System lacks an intuitive and simple way to traverse and search artifacts or locate various types within the Type System. Additionally, the creation and modification of artifacts is cumbersome requiring excessive developer or user time.

Therefore, there is a need in the art, for a data structure and application programming interfaces that enable users or developers to create, modify, and search artifacts such as classes and methods utilizing a simple and language neutral implementation.

BRIEF SUMMARY

Aspects of the present invention address one or more of the issues mentioned above, thereby providing a data structure and application programming interfaces to define and manipulate object model artifacts. The data structure of the present invention provides for a very flexible and memory efficient manner in which to create or modify an artifact. The data structure may comprise a base class for capturing common functionality of classes of the type system and a controller object for validating the creation or modification of artifacts. An application programming interface communicates and interacts with the data structure enabling a developer or user to initiate creation or modification of artifacts.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
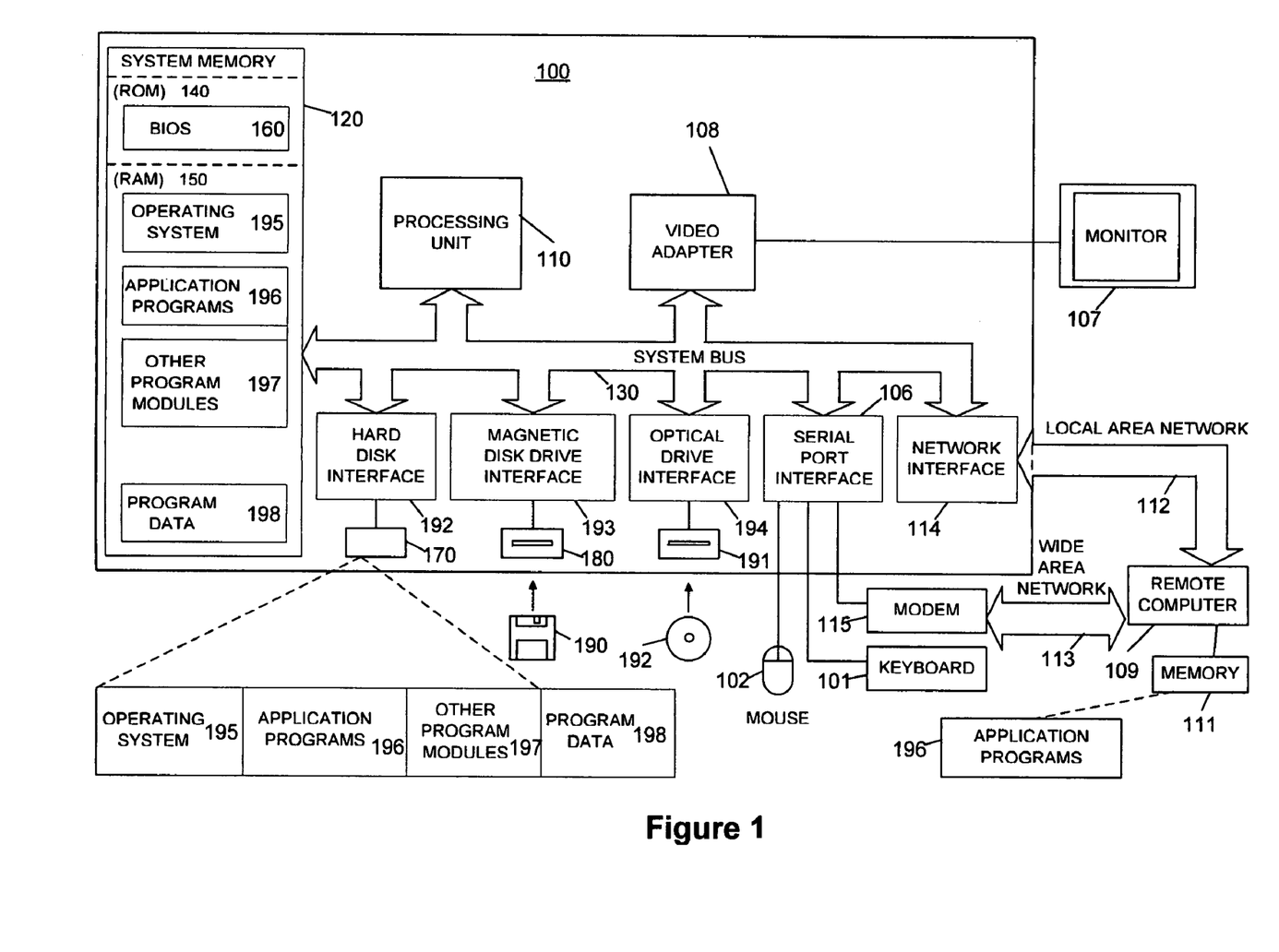
FIG. 1 shows a functional block diagram of a conventional general-purpose computer system that can be used to implement various aspects of the invention.

FIG. 1 is a functional block diagram of an example of a conventional, general-purpose, digital computing environment that can be used to efficiently implement an application programming interface and data structure of the type system in accordance with various aspects of the present invention. In FIG. 1, a computer 100 includes a processing unit 110, a system memory 120, and a system bus 130 that couples various system components, including the system memory, to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

DESCRIPTION OF ILLUSTRATIVE EMBODIMENT

FIGS. 2 through 9 depict unified modeling language diagrams illustrating various constructs of a data structure 201 of the present invention. Data structure 201 represents a data structure that works in concert with a type system framework. Data structure 201 may be a language neutral data structure that may assist users or developers in organizing and searching for various classes or artifacts of a type system. In addition, data structure 201 may allow a user or developer to specify various constructs and properties of the type system. For example, data structure 201 may enable a user or developer to specify that constraints for a particular property fall within a certain stated range of values.

Figure 2:
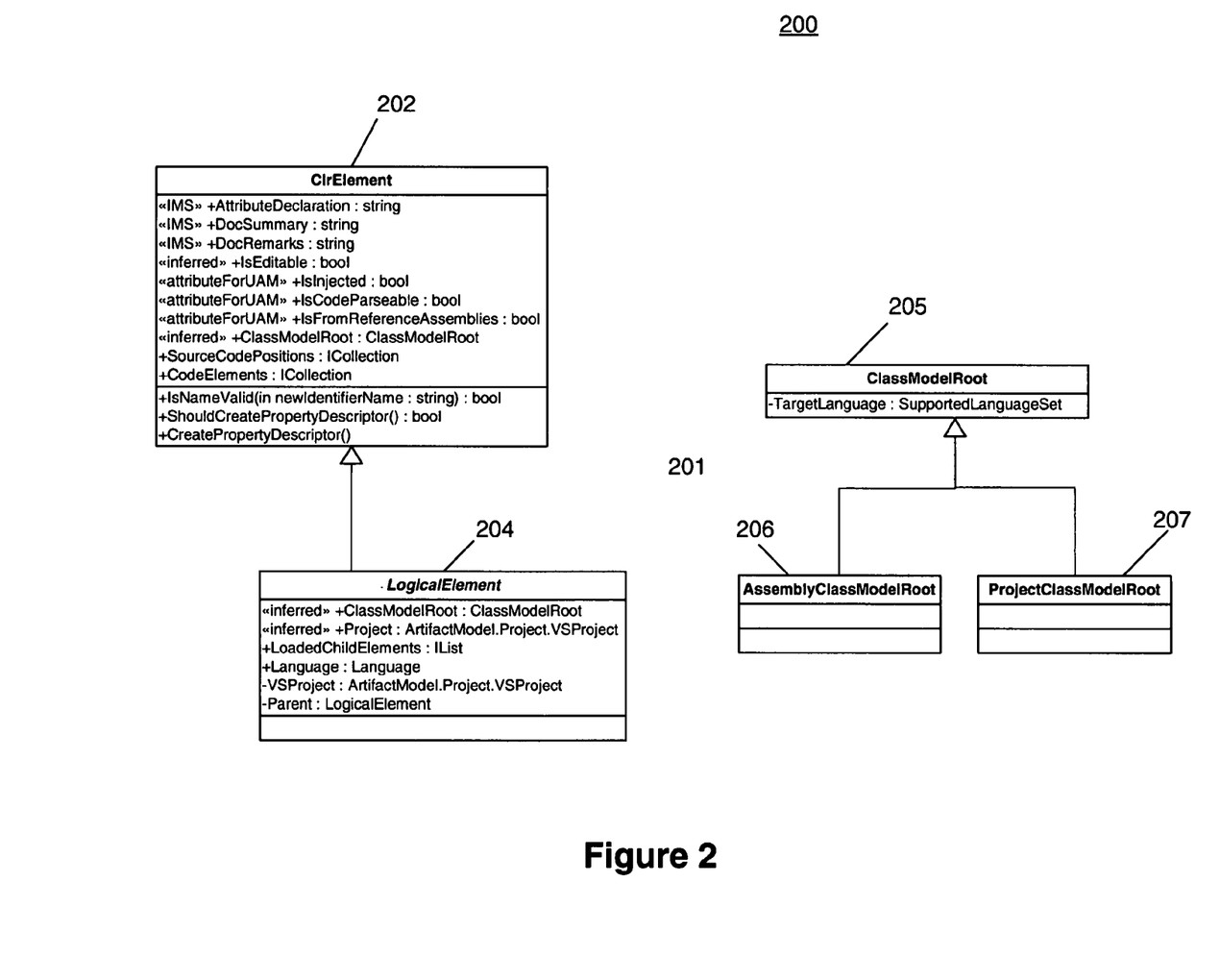
FIG. 2 depicts a unified modeling language diagram illustrating classes from a portion of data structure of the present invention in accordance with an aspect of the invention.

FIG. 2 illustrates a unified modeling language diagram 200 of data structure 201 in accordance with an aspect of the invention. As illustrated in FIG. 2, ClrElement 202 may be a higher level abstraction over LogicalElement 204. ClrElement 202 may be a base class for other data in data structure 201. ClrElement 202 may capture common functionality from other classes or objects. The capturing of common functionality by ClrElement 202 may enable a user or developer to request the performance of services on artifacts without specific knowledge of the artifacts. An artifact may include a namespace, a method, an interface, a class, an enumeration, a delegate, an attribute, a field, a property, an event, or other object programming construct. As those skilled in the art will realize, the above listing of the various forms of artifacts is exemplary and not intended to be an exhaustive list.

For example, a user or developer may decide to change the name of an artifact from "foo" to "bar." Prior to the current invention, a user or developer would need to know whether the artifact of interest is a method, namespace, or class as each of these artifacts have different naming rules depending upon the programming language that was used to create the artifact. By capturing the common functionality in ClrElement 202, a user or developer may not need to know whether the artifact of interest is a method, a namespace, or a class. ClrElement 202 upon receiving a request from a user or developer may determine the proper controller object to communicate with in order to determine if the name change can be validated for the particular programming language used to create the artifact.

Figure 3:
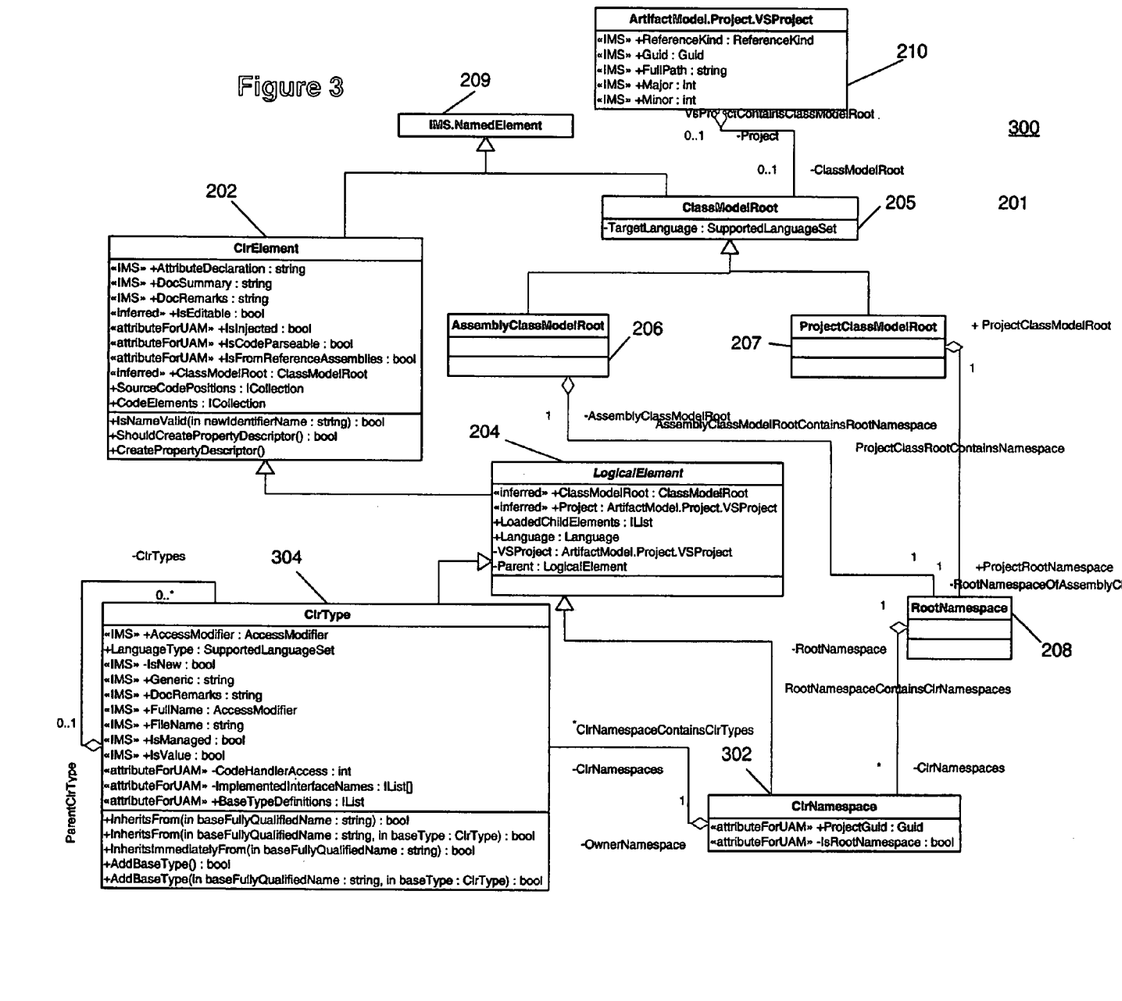
FIG. 3 depicts a unified modeling language diagram illustrating the specific classes of FIG. 2 and the relationships between these classes and other constructs in accordance with an aspect of the invention.

LogicalElement 204 is a base abstract class that provides a level of abstraction between ClrNamespace 302 (FIG. 3) and ClrType 304 (FIG. 3). ClrNamespace 302 is a meta-class that maintains the logical groupings of ClrType objects that reside inside a project in the type system.

LogicalElement 204 provides a user or developer a base class in which searching for artifacts is simplified in the type system. In addition, both ClrNamespace 302 and ClrType 304 may comprise nested classes. A nested class is a class that is fully enclosed within another class. In Microsoft® .NET, nested classes have public access to its parent or nesting classes. Similar to ClrType 304, ClrNamespace 302 may also contain classes. LogicalElement 204 may provide a user or developer with a mechanism to search the type system for classes or nested classes.

The higher level of abstraction provided by LogicalElement 204 may allow users or developers to search for nested class without knowing whether they are searching in a namespace or class. An application programming interface does not have to be specifically structured to identify a namespace, a type, or other nested namespaces or types, as LogicalElement 204 has captured this information. The user or developer can utilize a simplified and unified application programming interface for all searching as the application programming interface communicates with LogicalElement 204.

ClassModelRoot 205 is a container for all the types in the type system for a particular project. ClassModelRoot 205 is a higher level abstraction of AssemblyClassModelRoot 206 and ProjectClassModelRoot 207. ProjectClassModelRoot 207 allows a user or developer to reference other various projects. Each of the different projects may have associated types included with the project. ProjectClassModelRoot 207 captures the types in the project that are referenced by the class model root. AssemblyClassModelRoot 206 contains all types in compiled assemblies that a project may be referencing. ClassModelRoot 205 may contain one and only one RootNamespace 208. RootNamespace 208 may contain a collection of ClrNamespaces. ClassModelRoot 205 may also provide searching functionality.

Method ClassModelRoot.GetLogicalElementByFullyQualifiedName (string FullName) may allow a user to search a ClrNamespace or ClrType via the passed FullName. For example, in C# code may be written similar to public namespace foo {public class bar { }}. If a user has a ClassModelRoot object, then one can invoke method ClassModelRoot.GetLogicalElementByFullyQualifiedName( "foo.bar"). The invoked method may return to the user or developer a ClrType object which represents class bar.

FIG. 3 depicts a unified modeling language diagram 300 illustrating the specific classes of FIG. 2 and the relationships between those classes and other constructs in accordance with an aspect of the invention. In FIG. 3, RootNamespace 208 is depicted. RootNamespace 208 is a grouping of all of the namespaces and classes within a particular project. Those skilled in the art will notice that there is a one to one mapping between RootNamespace 208 and ClassModelRoot 205. FIG. 3 also depicts other classes such as IMS.NamedElement 209 and ArtifactModel.Project.VSProject 210 and their relationship to the above specified classes. IMS.NamedElement 209 and ArtifactModel.Project.VSProject 210 may not be part of a type system.

Figure 4:
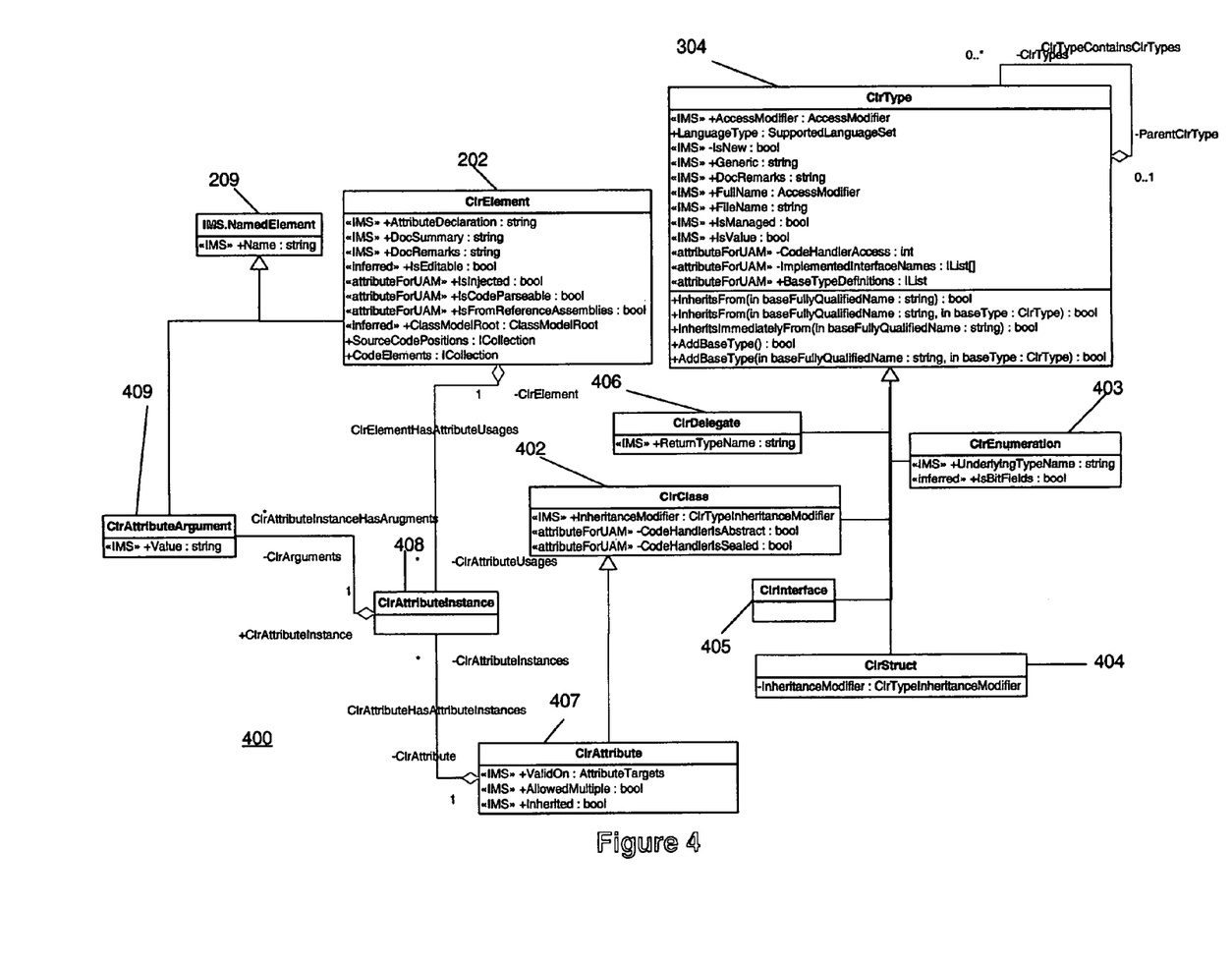
FIG. 4 depicts a unified modeling language diagram illustrating classes and the relationship of these classes to subclasses in accordance with an aspect of the invention.

FIG. 4 depicts a unified modeling language diagram 400 illustrating classes and the relationship of these classes to sub-classes in accordance with an aspect of the invention. In particular, ClrType 304 is abstract parent class for subclasses ClrClass 402, ClrEnumeration 403, ClrStruct 404, ClrInterface 405, and ClrDelegate 406. FIG. 4 also illustrates the relationships between ClrAttribute 407, ClrAttributeInstance 408, ClrAttributeArgument 409, and ClrElement 202.

Figure 5:
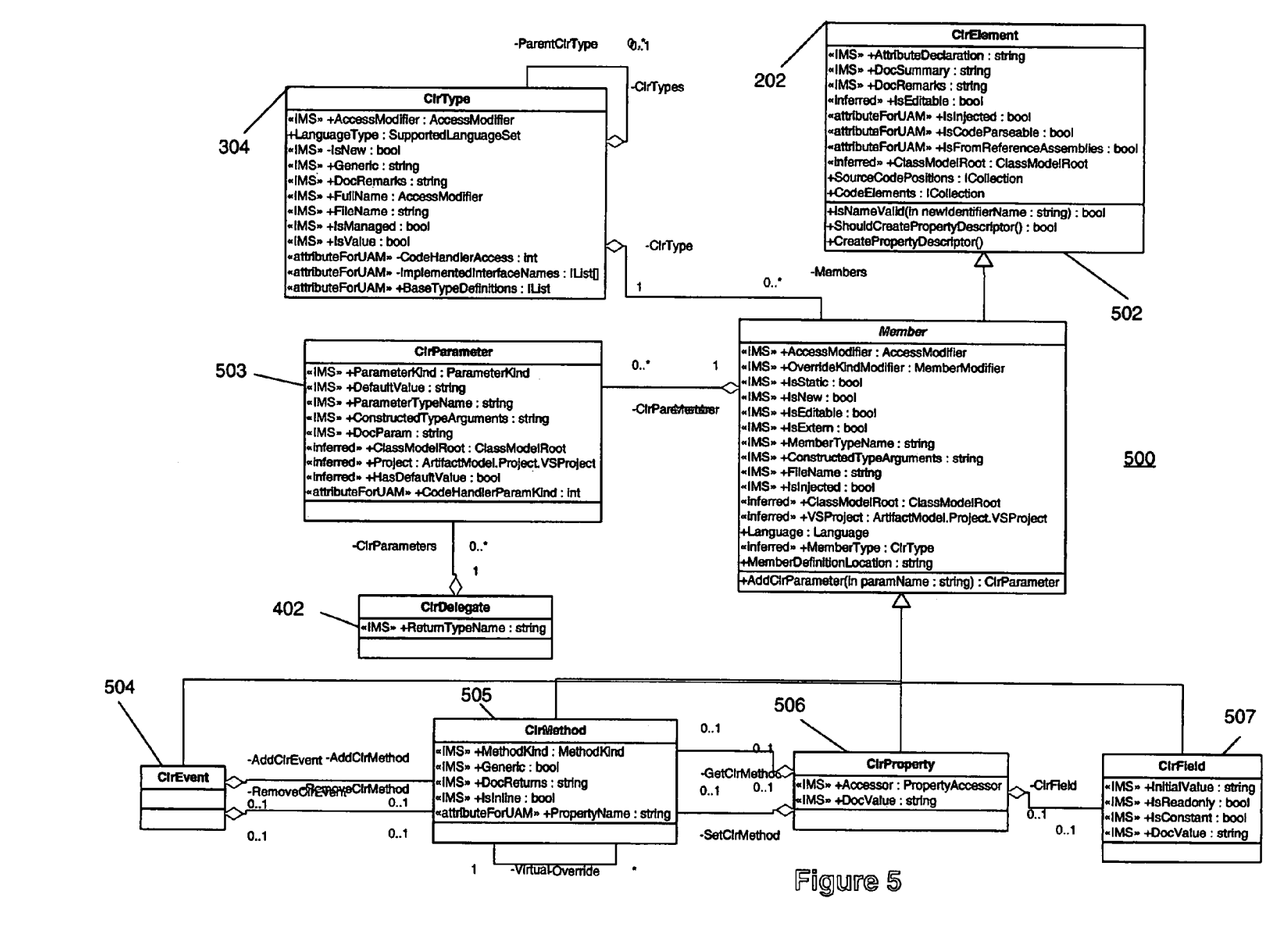
FIG. 5 depicts a unified modeling language diagram illustrating additional classes of the data structure of the present invention in accordance with an aspect of the invention.

FIG. 5 depicts a unified modeling language diagram 500 illustrating class Member 502 and the relationships between Member 502 and ClrEvent 504, ClrMethod 505, ClrProperty 506, and ClrField 507 in accordance with an aspect of the invention. Member 502 is an abstraction over ClrEvent 504, ClrMethod 505, ClrProperty 506, and ClrField 507. Member 502 may capture the commonality between ClrEvent 504, ClrMethod 505, ClrProperty 506, and ClrField 507. The abstraction may allow a user or developer to perform tasks without knowing the actual subclasses which are captured in Member 502.

Figure 6:
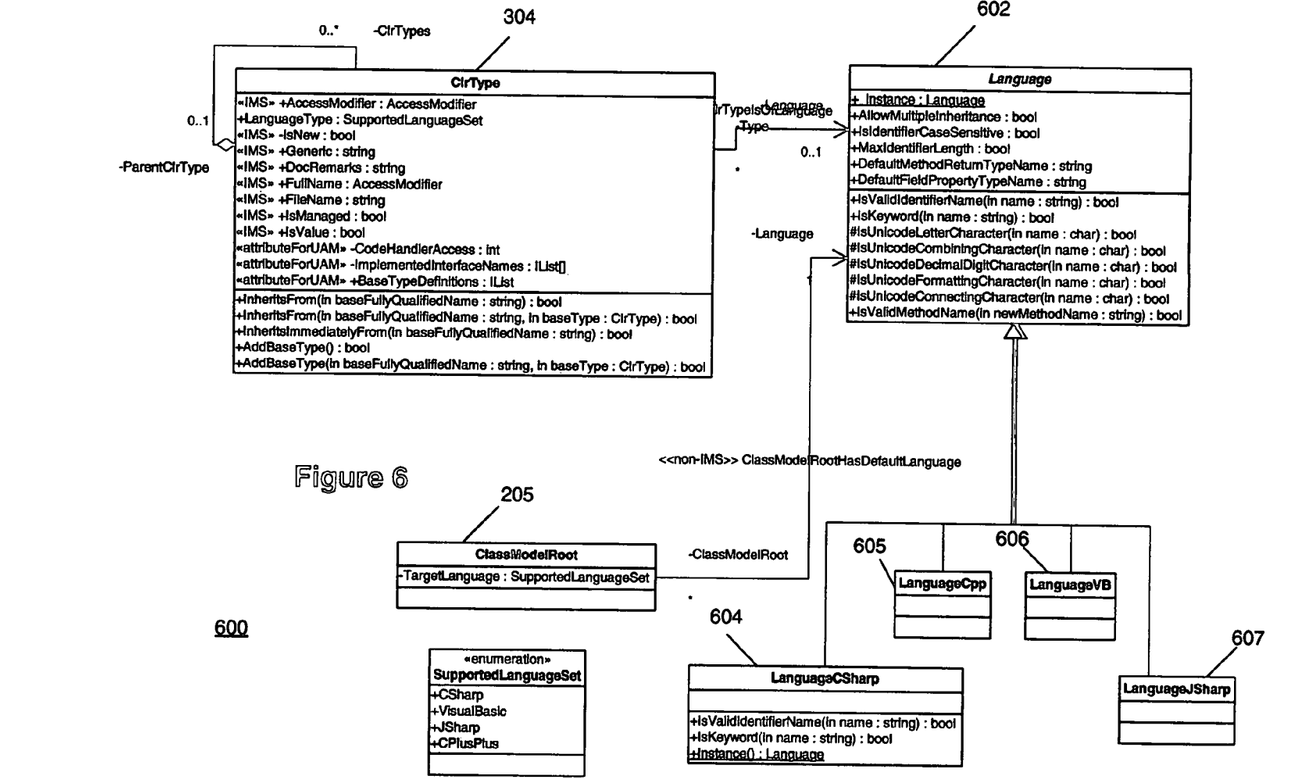
FIG. 6 depicts a unified modeling language diagram illustrating various language classes of the data structure of the present invention in accordance with an aspect of the invention.

FIG. 6 depicts a unified modeling language diagram 600 illustrating various languages that that a user or developer may utilize in accordance with the data structure 201 of the present invention. Language class 602 represents an abstraction over LanuageCSharp 604, LanguageC 605, LanguageVB 606, and LanguageJSharp 607. Those skilled in the art will realize that other programming languages other than Visual Basic, C++, C#, and J# are envisioned for use with data structure 201.

Language class 602 may contain language specific delimiter, tokens, or keywords. For example, Visual Basic® uses "( )" as an array specifier, whereas C# and C++ use "[ ]". "AddHandler" is a keyword in Visual Basic® but not for C++. This information may allow a user or developer to perform validation based on the language associated to a ClrElement. In addition, a user or developer may generate code (artifact) correctly.

Language class 602 may also control various aspects of ClrElement, as Language class 602 is a controller class. For example, Language class 602 may have a virtual method CanCreateDestructor(ClrType clrType). In this method, a true value may be returned when clrType is a regular class. In C++ language, a user or developer may also create destructor for struct. Therefore, in LanguageCpp class 605, one may override CanCreateDestructor(ClrType clrType) and return a true value when clrType is a class or a struct. The CanCreateDestructor(ClrType clrType) method may be used by the user of the Type System.

Figure 7:
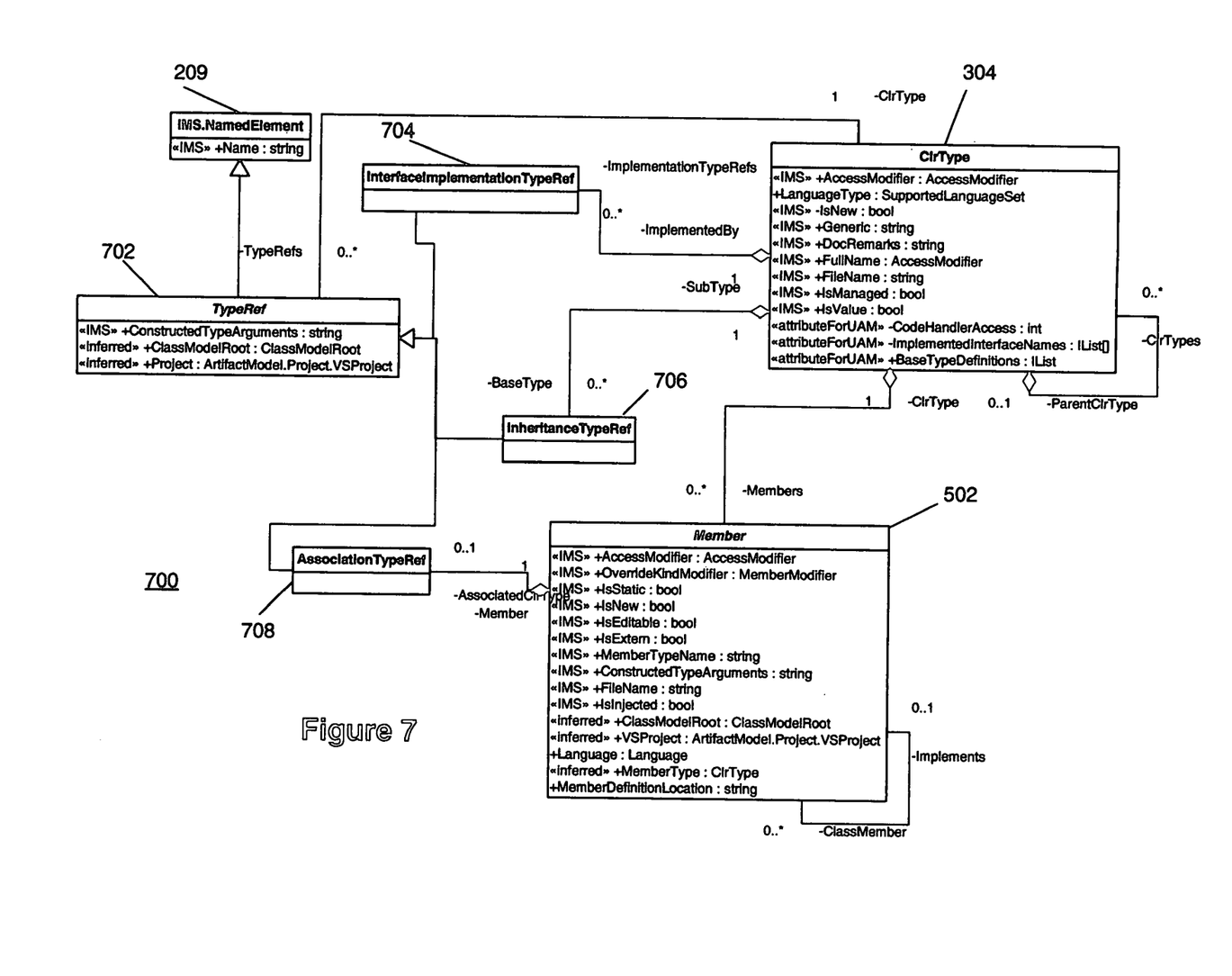
FIG. 7 depicts a unified modeling language diagram illustrating additional classes of the data structure of the present invention in accordance with an aspect of the invention.

FIG. 7 depicts a unified modeling language diagram 700 illustrating TypeRef 702 and the relationships between TypeRef 702 and InterfaceImplementationTypeRef 704, InheritanceTypeRef 706, and AssociationTypeRef 708. TypeRef 702 may assist a user or developer to maintain existing relationships between changing types in a project.

Figure 8:
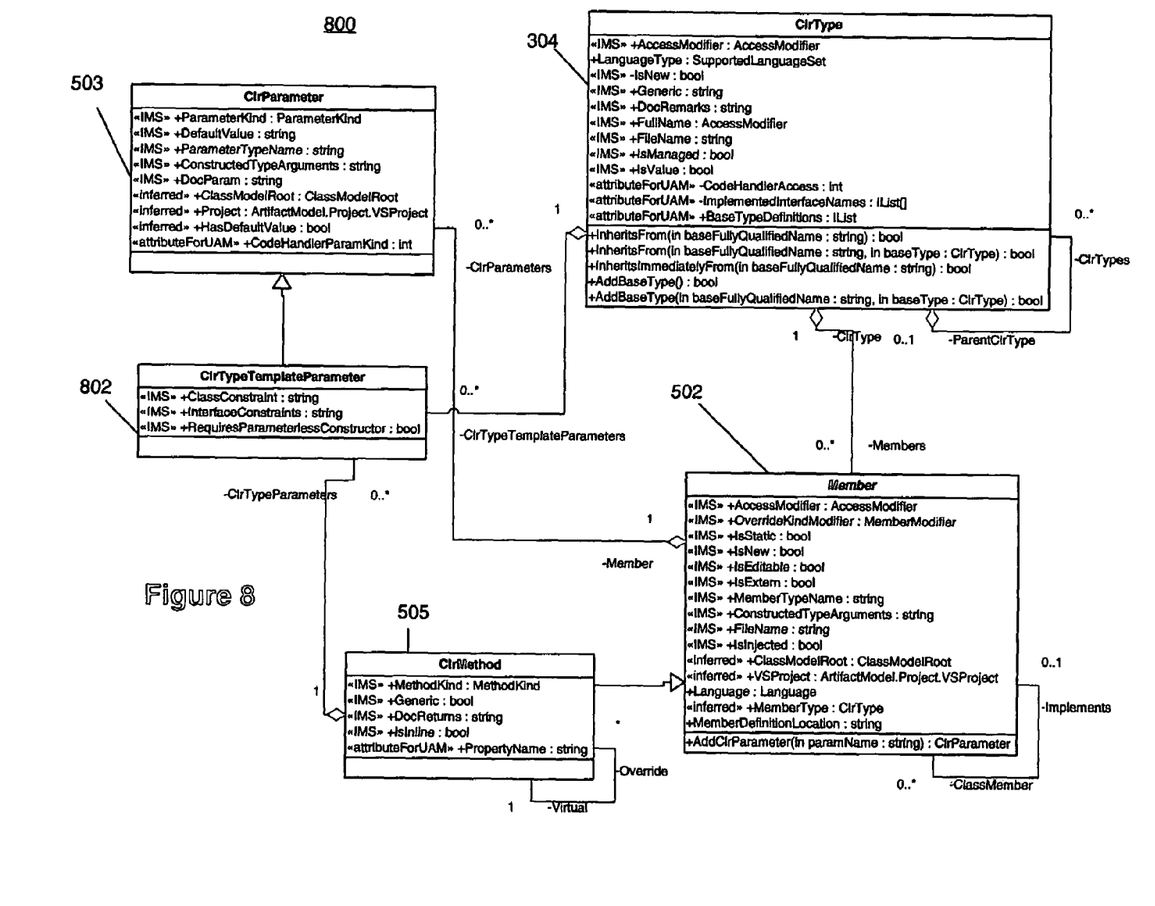
FIG. 8 depicts a unified modeling language diagram illustrating various relationships of classes of the data structure of the present invention in accordance with an aspect of the invention.
Figure 9:
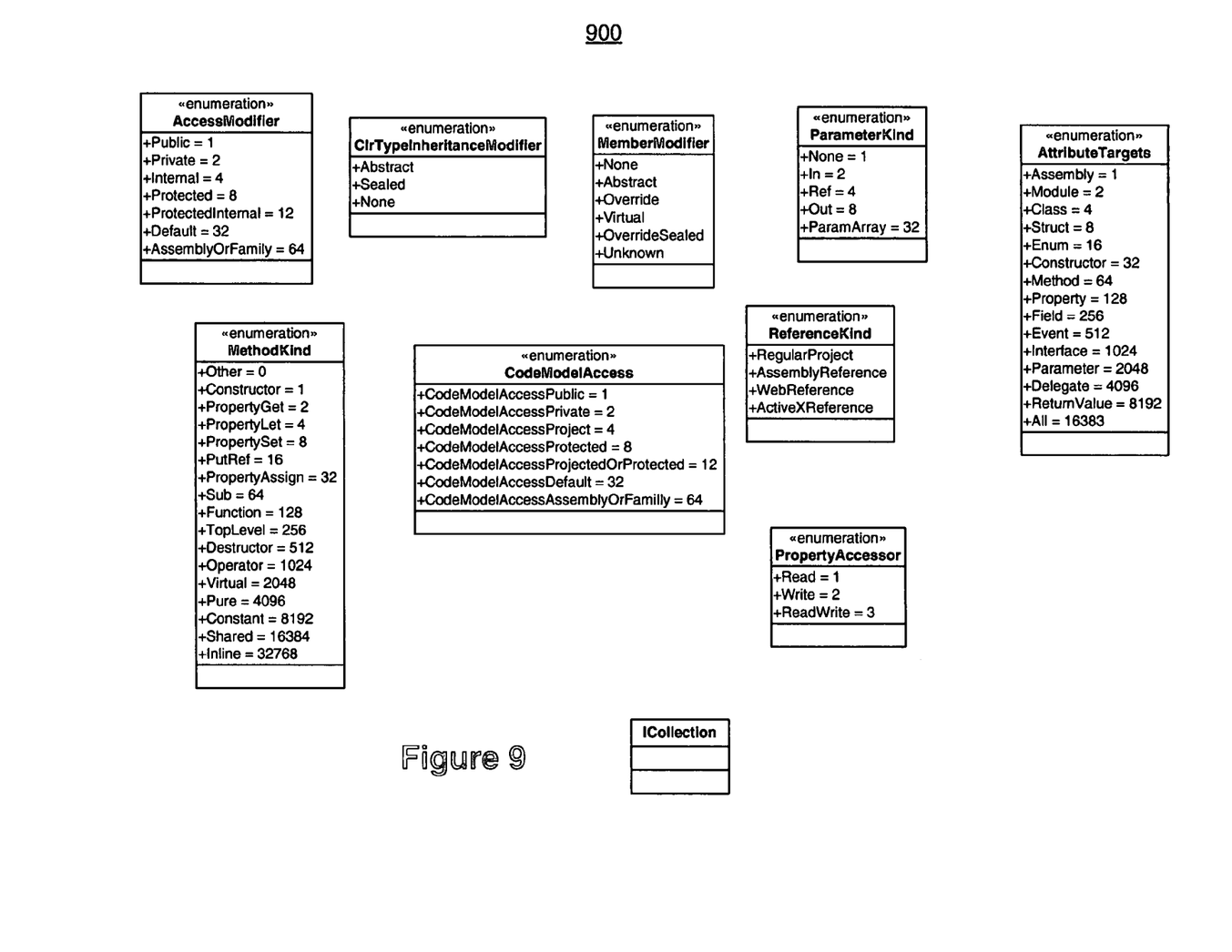
FIG. 9 depicts a unified modeling language diagram illustrating various additional classes of the data structure of the present invention in accordance with an aspect of the present invention.

FIGS. 8 and 9 depict unified modeling diagrams 800 and 900, respectively. In particular, FIG. 8 represents the relationship of ClrTypeTemplateParameter 802 to ClrParameter 503; whereas; FIG. 9 depicts various enumerations for use in data structure 201.

Figure 10:
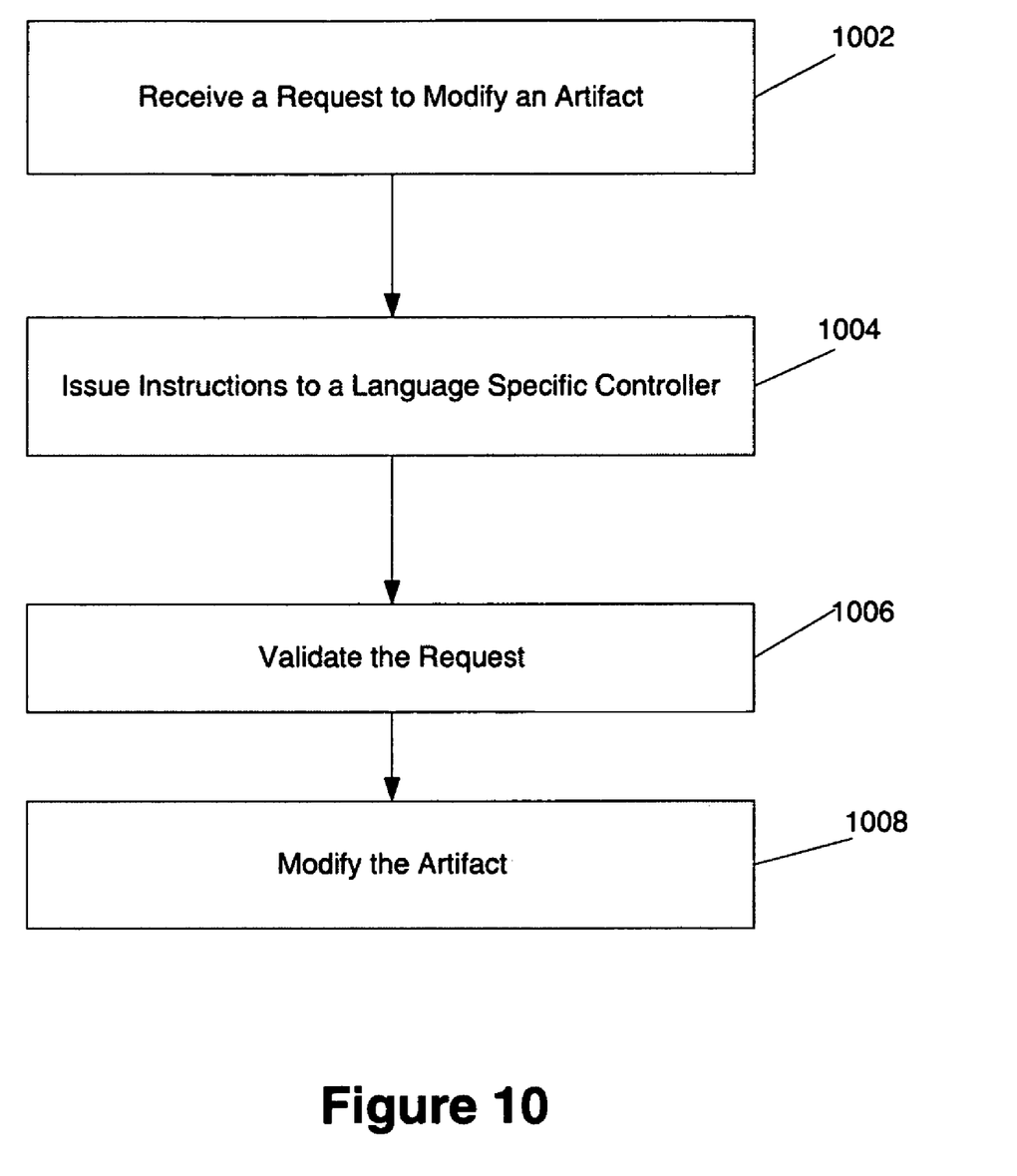
FIG. 10 illustrates a method of modifying an artifact in accordance with an aspect of the present invention.

FIG. 10 illustrates a method of modifying an artifact in accordance with an aspect of the present invention. In a first step 1002, a request is received to modify an artifact in the type system. The artifacts may comprise a namespace, a class, an interface, an enumeration, a delegate, an attribute, a field, a property, an event or other object programming construct.

The request may be received from an application programming interface. In step 1004, an instruction is issued to a specific language controller object to validate the request based on rules associated with a particular programming language. The programming language may include Visual Basic, C++, C#, and J#. The controller object validates the request in step 1006 and the artifact is modified in step 1008. After the artifact has been modified, the application programming interface may receive a response indicating that the artifact has been modified. Similar to the steps of FIG. 10, an artifact may be created in accordance with an aspect of the present invention.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer-readable medium encoded with a data structure, the data structure for a type system implemented within a computing environment and the data structure providing requested services on an artifact in the type system, the data structure comprising:

a) a ClrElement base class for capturing common functionality of objects of the type system, the ClrElement enabled to be associated with the artifact without specific knowledge of the artifact, the artifact comprising one of a namespace, a class , an interface, an enumeration, a delegate, an attribute, a field, a property, and an event, the ClrElement base class comprising data members AttributeDeclaration, DocSummary, DocRemarks, IsEditable, IsInjected, IsCodeParseable, and IsFromReferenceAssemblies;

b) at least one controller object, the controller object in communication with the base class, the at least one controller object validating the requested services based on a set of rules associated with a programming language; and c) a first class providing a search for the artifact in the type system without directly specifying the artifact, and the first class providing a level of abstraction between a second class and a third class in the type system meta-model, the second class and the third class searchable by the first class.

2. The computer-readable medium of claim 1, wherein the programming language comprises one of Visual Basic, C++, C#, and J#.

3. The computer-readable medium of claim 1, wherein the base class determines the at least one controller object to communicate with in order to validate the requested services.

4. The computer-readable medium of claim 1, wherein the second class and the third class comprise nested classes.

5. The computer-readable medium of claim 1, wherein the second class and the third class include nested namespaces.

6. The computer-readable medium of claim 1, wherein the data structure further comprises:
d) a container for storing types in the type system.

7. The computer-readable medium of claim 1, wherein the requested services comprise modifying the artifact in the type system.

8. The computer-readable medium of claim 1, wherein the requested services comprise creating a new artifact in the type system.

9. A method of modifying an artifact for use in a type system meta-model, the method comprising:
a) receiving a request from an application programming interface to modify an artifact in the type system meta-model, the artifact comprising one of a namespace, a class, an interface, an enumeration, a delegate, an attribute, a field, a property, and an event, wherein the type system meta-model comprises a ClrElement base class for capturing common functionality of objects of the type system in association with the artifact without directly specifying the artifact, the ClrElement base class comprising data members AttributeDeclaration, DocSummary, DocRemarks, IsEditable, IsInjected, IsCodeParseable, and IsFromReferenceAssemblies, and the type system meta model including a first class providing for a search for the artifact in the type system without directly specifying the artifact, the first class providing a level of abstraction between a second class and a third class in the type system meta model, the second class and the third class searchable by the first class;
b) in response to issuing at least one instruction to a language specific controller object,
the language specify controller object validating the request to modify the artifact based on rules associated with a programming language; and
c) in response to a validated request from the language specific controller, modifying the artifact.

10. The method of modifying an artifact for use in a type system meta-model of claim 9, wherein the method further comprises the step of:

d) transmitting a response to the application programming interface that the artifact has been modified.

11. The method of modifying an artifact for use in a type system meta-model of claim 9, wherein the programming language comprises one of Visual Basic, C++, C#, and J#.

12. The method of modifying an artifact for use in a type system men-model of claim 9, the second class and the third class comprise nested classes.

13. The method of modifying an artifact for use in a type system meta-model of claim 9, the second class and the third class include nested namespaces.

14. A method of creating an artifact for use in a type system meta-model, the method comprising:
a) receiving a request from an application programming interface to create an artifact in the type system meta-model, the artifact comprising one of a namespace, a class, an interface, an enumeration, a delegate, an attribute, a field, a property, and an event, wherein the type system meta-model comprises a ClrElement base class for capturing common functionality of objects of the type system in association with the artifact without directly specifying the artifact, the ClrElement base class comprising data members AttributeDeclaration, DocSummary, DocRemarks, IsEditable, IsInjected, IsCodeParseable, and IsFromReferenceAssemblies, and the type system meta-model including a first class providing for a search for the artifact in the type system without directly specifying the artifact, the first class providing a level of abstraction between a second class and a third class in the type system meta model, the second class and the third class searchable by the first class;
b) in response to issuing at least one instruction to a language specific controller object,
the language specific controller object validating the request to create the artifact based on rules associated with a programming language; and
c) in response to a validated request from the language specific controller, creating the artifact.

15. The method of creating an artifact for use in a type system meta-model of claim 14, wherein the method further comprises the step of
d) transmitting a response to the application programming interface that the artifact has been created.

16. The method of creating an artifact for use in a type system meta-model of claim 14, wherein the programming language comprises one of Visual Basic, C++, C#, and J#.

17. The method of creating an artifact for use in a type system meta-model of claim 14, the second class and the third class comprise nested classes.

18. The method of creating an artifact for use in a type system meta-model of claim 14, the second class and the third class include nested namespaces.

* * * * *